Patented Aug. 9, 1927.

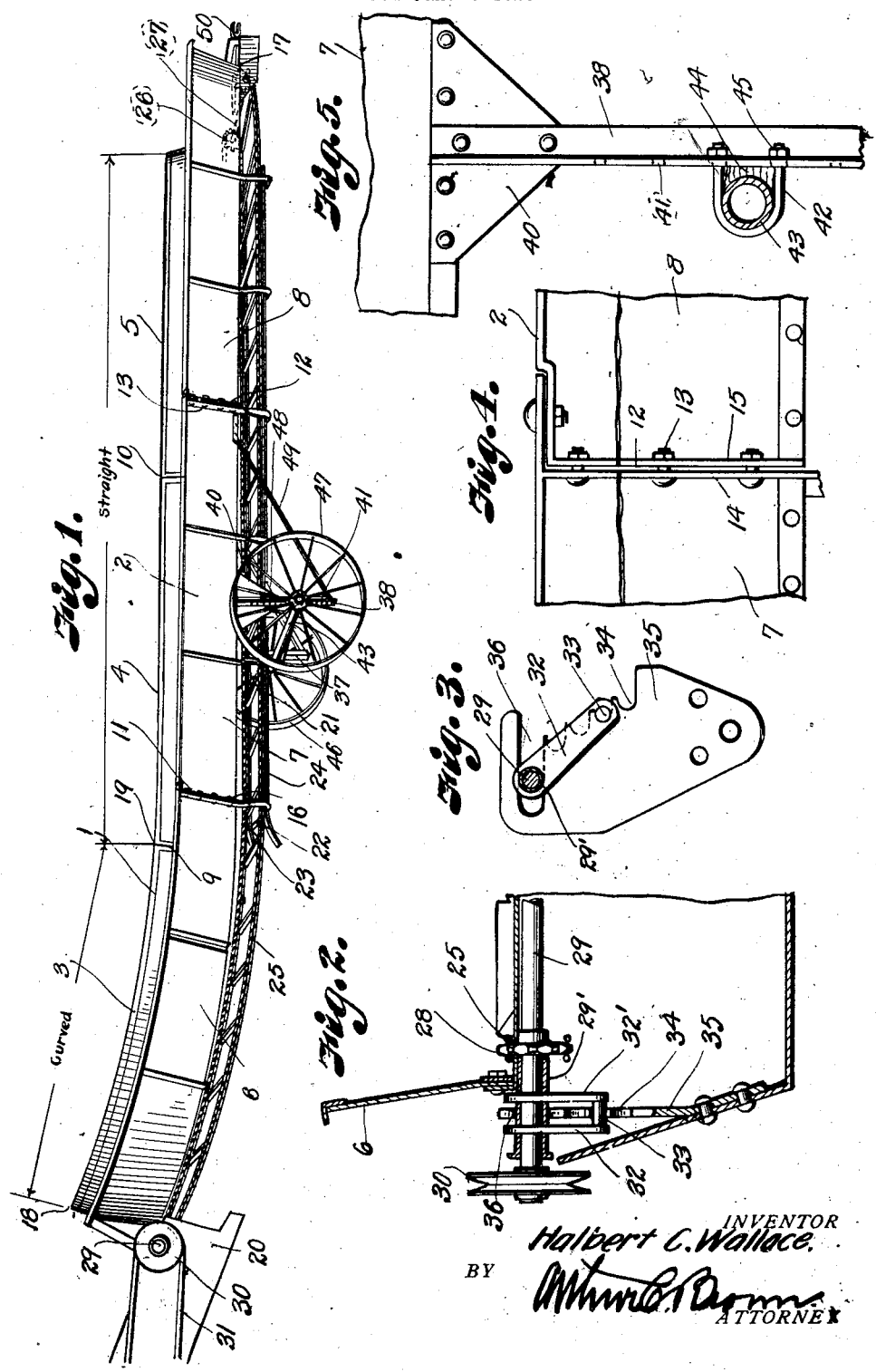

1,638,075

UNITED STATES PATENT OFFICE.

HALBERT C. WALLACE, OF KANSAS CITY, MISSOURI.

EXTENSION FEEDER.

Application filed January 2, 1925. Serial No. 283.

This invention relates to an extension feeder for threshing machines and the primary object of the invention is to provide a threshing machine feeding attachment whereby a greater amount of grain can be conveniently fed into the threshing machine than is possible with the standard equipment.

The grain is ordinarily "pitched" into the feeder of the threshing machine, the feeder being relatively short and as a result, it is practically impossible to feed as much grain into the machine as the machine is capable of handling and by providing an extension feeder attachment, relatively long, so that a number of men may pitch grain into the attachment, enough grain may be fed into the machine to keep it up to capacity.

A large proportion of the grain wasted with the average machine is caused by irregular feeding which is common to the standard machine. The machine is either slugged so full of grain as to over load the mechanism, particularly the sieves so that the separator does not have a chance to efficiently perform its work. At another time no grain will be going into the machine so that it speeds up and blows grain over into the straw pile with the attendant loss.

With the feeder attachment, the subject of my invention, there is ample room to lay the grain in the carrier without piling it up so that there is uniform feed, preventing overloading of the thresher by permitting it to work at approximate capacity all the time. The invention is so constructed that the receiving end is in a relatively low horizontal plane, the delivery end having a continual up-curve into the feeder end of the thresher so that the grain is carried in a continual sweep into the thresher, doing away with any tendency toward stopping the grain where it starts the upward movement toward the regular feeder as would be the case where two straight flat surfaces are connected at an angle.

For convenience I have made the feeder attachment sectional. Ordinarily it is about twenty-four feet long but it can be any length and it can be readily taken apart for shipping and it can be conveniently set up when it reaches its destination.

The novelty of the invention will be apparent by reference to the following description in connection with the accompanying drawings, in which Fig. 1 is a perspective view of a feeder attachment constructed in accordance with my invention.

Fig. 2 is a fragmentary cross sectional view through the same.

Fig. 3 is a detailed elevational view of the tightener for the driving mechanism.

Fig. 4 is a side elevational view showing the meeting ends of two joined sections, and Fig. 5 is a view showing the axle support for the feeder.

The feeder is shown as comprising two sectional sides 1 and 2. The side 1 is made up of three sections 3, 4 and 5. The side 2 is provided with similar sections 6, 7 and 8. The sections 3 and 4 are connected at 9. The sections 4 and 5 are connected at 10. The sections 6 and 7 are connected at 11. The sections 7 and 8 are connected at 12. the connected sections in each instance being fastened together by bolts 13 which pass through the flanges or angles 14 and 15 as indicated in Fig. 4, the method of connection shown in Fig. 4 being the method used at the points 9, 10, 11 and 12. The two side sectional members 1 and 2 have relatively straight bottoms from the point 16 to the point 17 but they are curved from the point 18 to the point 19, the point 17 being the inlet end and the point 18 the discharge end into the feeder 20 of the threshing machine. I have only shown the feeder 20 but since the threshing machine is so well known it is thought that it is unnecessary to describe it in detail and while the end 17 is designated the receiving end, it can be apparent that grain can be pitched into the machine anywhere between the points 17 and 18 so a number of men may be used to keep an adequate amount of grain in the feeder attachment.

Carried by the sides 1 and 2 between the points 16 and 17 are yokes 21 which have cross bars 22 extending across the bottom of the machine and below the lower edges of the members 1 and 2. These yokes support the rails 23 and 24 upon which the conveyor 25 may ride, the purpose of the rails being to prevent sagging of the conveyor. The conveyor passes around sprockets 26 on a shaft 27 near the end 17 and around sprockets 28 on a shaft 29 near the end 18 of the feeder, and since the end of the feeder between the points 18 and 19 are curved, it is not necessary to support the conveyor at this point. The shaft 29 carries a pulley 30 which receives its motion from a belt or chain 31 driven from some convenient part of the feeder 20. The bearing 29' on shaft 29 has two arms 32 and 32' connected at their lower ends by a rod 33 which constitutes a dog for engagement with one of the notches 34 on the bracket 35, the shaft 29 being received in the slot 36 in the bracket 35. This is for the purpose of providing a belt tightener for the belt 31. When the belt 31 is first put on, the dog 33 will engage the uppermost one of the series of notches 34. If the belt becomes slack the shaft will slide in the slot 36 to permit the dog 33 to drop into the notch 34 second from the top and as the belt becomes slack again, it will drop into the next lower notch and so on, thereby taking up the slack.

The feeder section, consisting of the members 4 and 7 carry two depending angles 37 and 38, each of which is fastened to its section by the plates 40. Each angle has holes 41 to receive the U-bolt 42 so that the axle 43 can be clamped between the U-bolt and the block 44 by the tightening nuts 45. The axle of course carries wheels 46 and 47, the parts 37 and 38 being braced to the feeder by the braces 48 and 49 and a draw bar 50 may be provided at the end 17 for pulling the feeding attachment over the ground.

The device can be easily transported from place to place and may be conveniently knocked down or disassembled for shipping. In actual practice I have found that such an attachment as constitutes the subject matter of this invention will enable the threshing machine to thresh considerably more bushels per day than without it, due to the fact that the grain is fed into the threshing machine at a uniform rate, maintaining an even load on the machinery of the threshing machine and thereby reducing the wear and tear on the thresher.

What I claim and desire to secure by Letters-Patent is:—

1. An extension feeder for threshing machines comprising an elongated hollow member having a conveyor therein, a bracket at one end of the body member having notches, a shaft for driving the conveyor mounted in a slot in the bracket and a dog loosely mounted upon the shaft for engaging the notches, the dog being adapted to successively engage lower notches upon the accumulation of slack in the driving connection between the shaft and its source of power.

2. An extension feeder for threshing machines comprising an elongated hollow member having a conveyor therein, a bracket at one end of the body member having notches, a shaft for driving the conveyor mounted in a slot in the bracket and a dog loosely mounted upon the shaft for engaging the notches, the dog being adapted to successively engage lower notches upon the accumulation of slack in the driving connection between the shaft and its source of power, the dog including a bar and two arms connected to the bar, said arms being secured to the shaft.

3. A slack take up, comprising a plate having a slot and notches below the slot, a shaft in the slot, depending arms on the shaft, and a cross bar at the lower ends of the arms engageable with the successive notches as the shaft moves longitudinally of the slot.

In testimony whereof I affix my signature.

HALBERT C. WALLACE.